US008839414B2

(12) United States Patent
Mantle et al.

(10) Patent No.: US 8,839,414 B2
(45) Date of Patent: Sep. 16, 2014

(54) AUTHENTICATED DATABASE CONNECTIVITY FOR UNATTENDED APPLICATIONS

(75) Inventors: James Alexander Sydney Mantle, Stittsville (CA); Garney David Adams, Stittsville (CA)

(73) Assignee: Irdeto Canada Corporation, Ottawa (CA)

( * ) Notice: Subject to any disclaimer, the term of this patent is extended or adjusted under 35 U.S.C. 154(b) by 178 days.

(21) Appl. No.: 12/992,325

(22) PCT Filed: Jun. 1, 2009

(86) PCT No.: PCT/CA2009/000759
§ 371 (c)(1),
(2), (4) Date: Nov. 12, 2010

(87) PCT Pub. No.: WO2009/143631
PCT Pub. Date: Dec. 3, 2009

(65) Prior Publication Data
US 2011/0093937 A1 Apr. 21, 2011

Related U.S. Application Data

(60) Provisional application No. 61/057,557, filed on May 30, 2008.

(51) Int. Cl.
*G06F 7/04* (2006.01)
(52) U.S. Cl.
USPC .......................................................... 726/19
(58) Field of Classification Search
USPC .......................................................... 726/19
See application file for complete search history.

(56) References Cited

U.S. PATENT DOCUMENTS

| 5,937,159 | A | 8/1999 | Meyers |
| 6,006,018 | A | 12/1999 | Burnett |
| 6,006,333 | A | 12/1999 | Nielsen |
| 6,052,785 | A | 4/2000 | Lin |

(Continued)

FOREIGN PATENT DOCUMENTS

| JP | H09-198297 A | 4/1997 |
| JP | 2002157226 A | 5/2002 |

(Continued)

OTHER PUBLICATIONS

Bernard Van Haecke, "JDBC Perfect Guide, Java Database Connectivity", Computer Age Co., Ltd., Jun. 10, 1998, 1st Edition, pp. 26-27, 31-37, 61-64, 353, 377-378 (in Japanese language).

(Continued)

*Primary Examiner* — Jacob Lipman
(74) *Attorney, Agent, or Firm* — Marc S. Kaufman; Reed Smith LLP

(57) ABSTRACT

A custom database connectivity component is deployed in conjunction with a native database connectivity component and a credential manager. The custom connectivity component has a requestor interface for communicating with a requestor application, a credential service interface for communicating with the credential manager, a native database connectivity interface for communicating with native connectivity components, and a decision engine for determining how to convert a request from a requestor to an appropriate API call to the credential manager. The custom connectivity component provides an authenticated and authorized database connection for a requestor application. The component transparently serves retrieves database, or other target resource, credentials on a real time basis, without requiring code changes to the requestor application.

20 Claims, 4 Drawing Sheets

(56) References Cited

U.S. PATENT DOCUMENTS

| | | |
|---|---|---|
| 6,668,327 B1 | 12/2003 | Prabandham |
| 2004/0093515 A1 | 5/2004 | Reeves, Jr. |
| 2004/0210756 A1 | 10/2004 | Mowers et al. |
| 2005/0108521 A1 | 5/2005 | Silhavy |
| 2006/0156023 A1 | 7/2006 | Luo et al. |
| 2008/0148373 A1 | 6/2008 | Adams |

FOREIGN PATENT DOCUMENTS

| | | |
|---|---|---|
| JP | 2002278931 A | 9/2002 |
| JP | 2003228509 A | 8/2003 |
| JP | 200605980 A | 3/2006 |
| JP | 2008059187 A | 3/2008 |

OTHER PUBLICATIONS

"Oracle (R) Database, New Features Guide, 10g Release 2 (10.2)", Oracle Corporation, Aug. 31, 2005, 1st Edition, p. 1-38 (in Japanese language).

"IBM Tivoli Storage Manager for Database 5.1.5 Data Protection for Microsoft SQL Server: Install & User Guide", Japan IBM Co., Ltd., Oct. 31, 2002, 1st Edition, p. 21 (in Japanese language).

Final Rejection (English Translation) in corresponding Japanese Patent Application No. 2011-510795 dated Apr. 15, 2014.

AUTHENTICATED DATABASE CONNECTIVITY FOR UNATTENDED APPLICATIONS

CROSS REFERENCE TO RELATED APPLICATIONS

This application is a National Entry of PCT/CA2009/000759, filed Jun. 1, 2009, which claims the benefit of U.S. Provisional Application No. 61/057,557, filed May. 30, 2008, the contents of which are incorporated herein by reference in their entirety.

FIELD OF THE INVENTION

The present invention relates to security systems for computer systems. More particularly, it relates to methods and systems for credential management, particularly for granting access to resources to software applications without human intervention.

BACKGROUND TO THE INVENTION

The ever rising dependency on computer systems has resulted in an attendant rise in concern regarding computer security. One well-known method for restricting access to computers and computer resources (e.g. one program or application accessing another) is that of using passwords. Hard-coded application passwords provide the de-facto methodology to permit one application (requester) to authenticate to another application or service (target), such as a database, for the purpose of gaining access to the resources and/or data offered by the target.

However, hard-coding of passwords creates significant vulnerabilities to data since the hard-coded passwords remain as clear-text information that is susceptible to malicious viewing. Such passwords also require distribution to developers and have long validity periods to accommodate for their lack of change. These considerations only increase the vulnerability to security breaches.

For those organizations with password change policies, hard-coded passwords have a drawback in that they entail a recurring software maintenance issue. Also, there are significant costs associated with human redevelopment effort and there is a potential for application outages due to synchronization errors and timing.

Regardless of these drawbacks, hard-coded passwords remain in use for approximately 90% of all corporate applications. New applications are being developed and deployed that contain hard-coded passwords. Third-party (vendor) applications force corporations to accept and deploy systems containing hard-coded passwords. 70% of datacenter applications are database driven.

While User Identity Management systems offer authentication and authorization of individuals to systems, there are significant difficulties in utilizing these solutions for the purposes of unattended applications: they rely upon user manual interaction for authentication; they rely upon user manual interaction for recovery of authentication credentials; they do not include credential access and management capabilities for automatic use by unattended scripts and applications; they offer no tamper resistance; they offer no defence against static or dynamic analysis; and they assume that employees are generally to be trusted, an assumption which is demonstrably untenable due to the prevalence of insider attacks.

Another possibility is the use of provisioning systems. Provisioning systems offer the ability to push operating system and software configuration updates to servers. However, there are significant difficulties of utilizing these solutions for the purposes of unattended applications: they do not include run-time retrieval of credentials for use by unattended scripts and applications; they do not include credential access and management capabilities for automatic use by unattended scripts and applications; they offer no tamper resistance; and they offer no defence against static or dynamic analysis.

Another option is the use of Public Key Infrastructures. Public Key Infrastructures offer the components needed to create a comprehensive and elegant authentication and authorization solution. However, there are significant difficulties of utilizing these solutions for the purposes of unattended applications: they do not protect keying materials while in memory; they rely upon user interaction for access to authentication credentials; they do not include credential access and management capabilities for automatic use by unattended scripts and applications; they offer no tamper resistance; they offer no defence against static or dynamic analysis or tampering of the application code; they dramatically shift the authentication paradigm for corporations and incur larger integration and deployment efforts; and both the authenticator and the authenticate must be modified to make use of PKI for authentication purposes.

Another possibility is the use of the Kerberos authentication protocol. The Kerberos authentication protocol offers the components needed to create a comprehensive and elegant authentication and authorization solution. However, However, there are significant difficulties of utilizing this solution for the purposes of unattended applications: it does not protect keying materials while in memory; it relies upon user interaction for access to authentication credentials; it relies on hard-coded passwords for authentication by unattended applications; it does not include credential access and management capabilities for automatic use by unattended scripts and applications; it offers no tamper resistance; it offers no defence against static or dynamic analysis or tampering of the application code; it dramatically shifts the authentication paradigm for corporations and incurs large integration and deployment efforts; and it requires that both the authenticator and the authenticatee be modified to make use of Kerberos for authentication purposes.

There is therefore a need for systems and methods which will allow for unattended authentication of applications so that these applications can access resources. Ideally, such systems and methods avoid the shortcomings of hard-coded passwords while providing a similar if not higher level of security.

SUMMARY

It is therefore an object of this invention to provide a novel method and system of password release that obviates or mitigates the disadvantages of the prior art.

According to an aspect, there is provided a computer-implemented method for providing secure credentials for accessing a target resource. The method, when executed on one or more processors, causes the one or more processors to perform the following steps. A connection request to the target resource is received from a requestor application. The request is then decoded, such as by parsing, to extract information required by a credential manager to authenticate the requestor application and to retrieve the secure credentials, such as username and password, for accessing the target resource. The credential manager manages and stores credentials for the target resource. The extracted information is then securely communicated to the credential manager to retrieve the credentials. The secure communication can, for example, comprise encrypting communications to and from the credential manager. Using the credentials retrieved from the credential manager, a native target resource connection request to the target resource is generated. This native target resource connection request is then passed to a native target resource connectivity component to establish a connection between the requestor application and the target resource.

According to embodiments, the method can implement Java Database Connectivity (JDBC) Application Programming Interfaces (APIs). Receiving the connection request comprises receiving a JDBC Uniform Resource Locator (URL) containing a target resource URL, and a target alias for retrieving the credentials from the credential manager, and generating the native target resource connection request comprises packaging the retrieved credentials with the target resource URL to provide a native JDBC URL.

According to further embodiments, the method can implement Open Database Connectivity (ODBC) APIs, wherein receiving the connection request comprises receiving an ODBC connection request containing a target alias for retrieving the credentials from the credential manager, and a connection string for the native target resource connectivity component, and generating the native target resource connection request comprises packaging the retrieved credentials with the connection string.

According to a further aspect, there is provided a computer program product comprising a computer-readable medium storing computer executable instructions to provide secure credentials for accessing a target resource. When executed, the instructions cause the one or more processors to implement the following functional modules. A requestor interface is implemented to communicate with a requestor application to receive a connection request including target resource information identifying the target resource and configuration information necessary to authenticate the requestor application. A credential service interface is implemented to securely communicate with a credential manager that manages and stores credentials for the target resource. A native database connectivity interface is implemented to communicate with a native database connectivity component that establishes a connection with the target resource. And, a decision engine is implemented to communicate with each of the requestor interface, the credential service interface and the native database connectivity interface. The decision engine function to decode the request to determine an identity of the target resource and the configuration information required by the credential manager to authenticate the requestor application and to retrieve the secure credentials for accessing the target resource, the credential manager managing and storing credentials for the target resource; securely communicate the extracted information to the credential manager to retrieve the credentials; generate a native database connection request to the target resource, including the retrieved credentials; and pass the native database connection request to the native database connectivity component to establish the connection.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
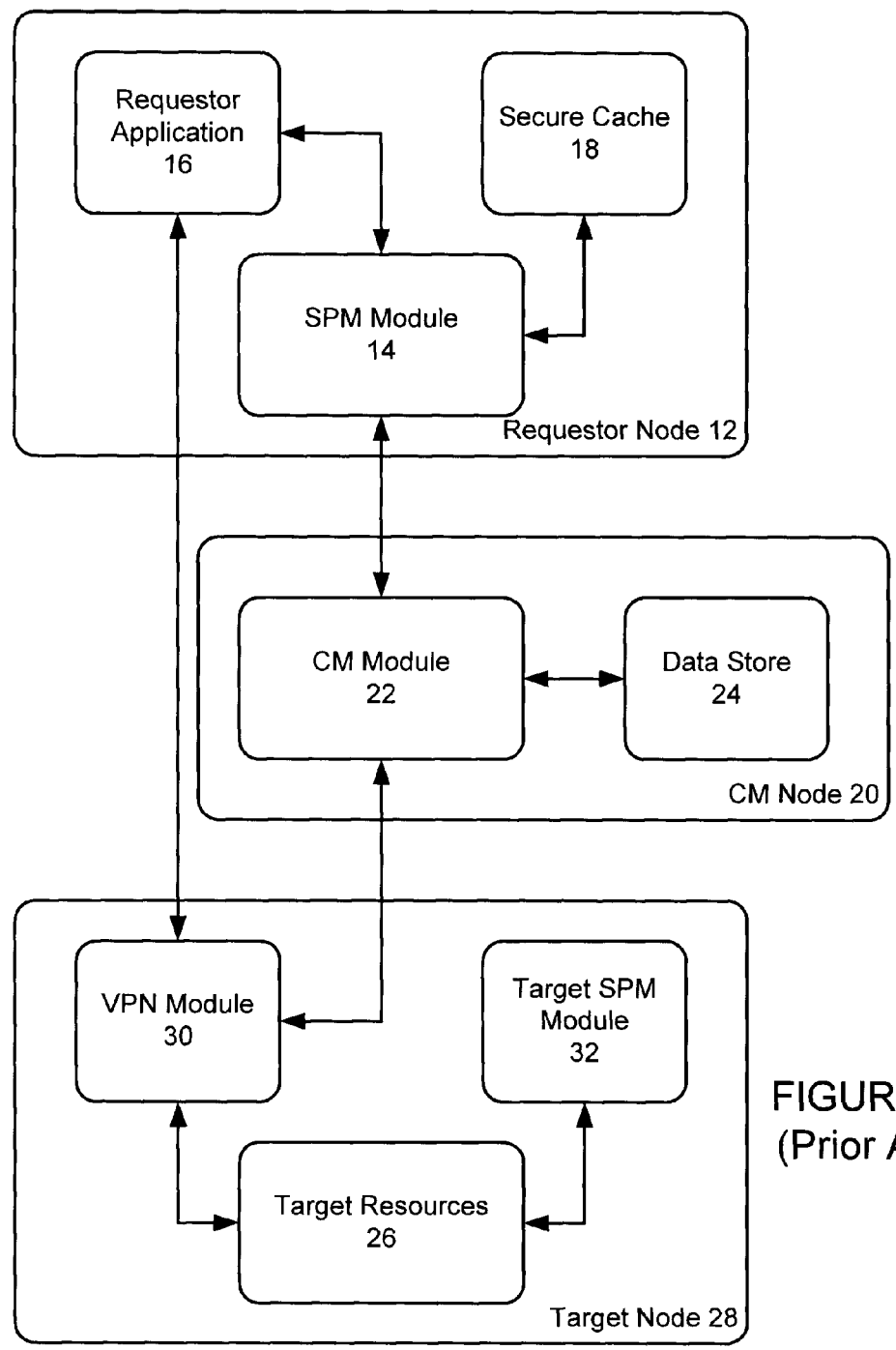
FIG. 1 is a block diagram of a prior art system for credential management.

FIG. 1 illustrates a prior art system 10 for credential management, as described in U.S. application Ser. No. 11/640,371 (U.S. Publication No. 2008/0148373), entitled "Simplified Management of Authentication Credentials for Unattended Applications," the contents of which are incorporated herein by reference in their entirety. A requestor node 12 has resident on it a server password manager (SPM) module 14, a requestor application 16 and, optionally, a secure cache module 18. The requestor node 12 communicates with a credential manager (CM) node 20 that implements a password authority system. The CM node 20 has resident on it a CM module 22 and a data store module 24. The requestor node 12 communicates with the CM node 20 to request access to resources 26 on target node 28. A VPN (virtual private network) module 30 may optionally be resident on the target node 28 to govern communications with either or both the CM node 20 and the requestor node 12.

The requestor node 12, the CM node 20, and the target node 28 are all nodes in a computer network and may be single machine servers or a collection of interconnected servers. The various modules in FIG. 1 are software modules which interact with the hardware of the nodes to execute their instructions.

The CM node 20 operates with the CM module 22 controlling the data store 24 which stores the credentials required to access the resources 26. The requestor application 16, when it needs access to the resources 26, must request these credentials to gain access to the resources. The requestor application's request is communicated to the SPM module 14 residing on the same node as the requestor application 16. The SPM module 14 receives the request, extracts the relevant information from the request, and packages that information into a request package for transmission to the CM module. The SPM module 14 encrypts the request package using encryption keys generated by the CM module 22 and previously communicated to the SPM module 14. The SPM module 14 also transmits, with the encrypted request package, fingerprint data related to the requestor node 12.

To communicate the credentials to the target resources 26, the CM module 22 may send these credentials directly to the target resources 26 along with an identification of the requestor application 16 which is to be granted access. Alternatively, the CM module 22 may return the credentials to the SPM module 14 so that the requestor application 16 may directly use these credentials to access the target resources 26. The CM module 22 may also communicate with the target resources 26 and its associated SPM module 32 for updates regarding changed credentials such as passwords and encryption keys.

It should be noted that the SPM module 14 in the requestor node 12 may use the secure cache 18 to store credentials for the requestor application 16 so that future accesses to the target resources need not go through the CM module 22. Similarly, encryption keys generated by the CM module 22 and used by the SPM module 14 to encrypt/decrypt communications with the CM module 22 may also be stored in the secure cache 18.

To operate securely, each SPM module 14, 32 must, before being able to execute the process outlined above, identify itself to the CM module 22 and receive unique encryption keys for use in communicating with the CM module 22. As part of this setup stage, each SPM module 14, 32 gathers data about its node 12, 28 including what resources may be target resources, what applications may be requestor applications, and the details regarding these resources and applications. The SPM module 14, 32 also gathers configuration information for its node such as the hardware installed on the node and other configuration information that would uniquely identify that node. This configuration information (which may include serial numbers, applications installed on the node, version numbers of both software and hardware installed) may then be used as a "fingerprint" of that node. The fingerprint data may collected on one node can then be sent, along with the other information on that specific node, to the CM node 20 for validation. Once validated, a requestor node, and the SPM module resident on it, can request access to resources registered with the CM module 22. Of course, only the requestor applications resident on nodes registered with the CM module 22 are permitted to access the target resources 26. New applications on a node must register and be validated by the CM module 22 prior to being able to request access to the target resources.

It should be noted that, to gain access to the credentials needed to access resources, each SPM module must provide its node's fingerprint data every time a requestor application resident on its node asks for access. As mentioned above, this fingerprint data is transmitted to the CM module 22 along with the relevant information relating to the target resource access request by the requestor application. When the CM module 22 receives such fingerprint data, the CM module 22 can retrieve the registration data for that particular node from the data store 24 to check if the fingerprint data received from the requester node matches the fingerprint data received when the requestor node was first validated. If there is a match, then the SPM module is what it purports to be and further checking may proceed. If there is no match, then the resource access request is denied. Denial of such a request means that the requestor node must undergo the initial registration/validation process.

It should further be noted that, once a requestor node (through an SPM module resident on it) or an SPM module (if there is more than one SPM module per requestor node) is validated by the CM module 22, the CM module generates cryptographic keys which are to be used in communications between the CM module 22 and the SPM module or requestor node. These cryptographic keys are, once a copy has been sent to the relevant SPM module/requestor node, kept in the data store 24 for use by the CM module. It should be clear that a requestor node may have more than one SPM module resident on it, with each SPM module being tasked with managing target resource access for at least one requestor application on the requestor node. For such a configuration, each SPM module may have its own set of cryptographic keys for use in communicating with the CM module. For greater security one may have a configuration in which each requestor application has its own encryption keys shared with the CM module for use when communicating between the two.

Each requestor application, along with its associated SPM module and the node it is resident on, is registered and validated with the CM module. To gain access to the target resources, the requestor application asks for such access and transmits data that it originally transmitted to the CM module when it sought validation and registration. Such data may include its application name, its application file storage location, its application execution path, its application identification (ID), its application one-way hash value, its session authorization key, and the machine fingerprint of the node it is resident on. Of course, depending on the configuration of the system, any subset of the above, with or without extra data, may also be used to gain access to the resources.

Regarding the data store 24 in the CM node 20, the data store may be in the form of a database. Critical values may be encrypted using a strong cipher for storage in a database field in the database. Critical encrypted data may be written into a private database using a long, strong password, the private database being part of the database. This private database may then be protected using a password that is encrypted using a managed symmetric key. The managed key may then be placed in a public database table to allow the key to be changed in an ad hoc or scheduled manner.

To simplify the record keeping duties of the CM module, the concept of aliases may be used. Each target resource (e.g. an application on a target server) may be associated with a specific alias. Also associated with the alias are the target resource's credentials (e.g. account and password). A potential requestor application which may request access to the target resource, when registered/validated, is then mapped to the alias along with that requestor application's access rights and any run-time criteria required for the release of credentials for access to the target resource. This injects a level of indirection for retrieving credentials—it allows credentials to change without any impact on the requestor application. Requestor applications, therefore, need not be individually notified if credentials required to access a specific resource are changed.

As noted above, the SPM module 14 may use the secure cache 18 so that previously accessed resources may be accessed by other requestor applications on the same node. This will allow faster access to resources for requestor applications. To use the secure cache 18, credentials received from the CM module 22 may be saved in the secure cache 18. Should a requestor application 16 on the same node as the SPM module 14 request access to resources for which credentials have been stored in the secure cache 18, the SPM module 14 can authenticate the requestor application locally and provide the necessary credentials. Of course, for security reasons, the contents of the secure cache may be encrypted and the contents may be time limited in that the contents may be automatically deleted after a predetermined amount of time. Such a scheme ensures that credentials need to be accessed periodically such that stale credentials are never stored indefinitely.

To ensure that the credentials (e.g. passwords and encryption keys) used to access the resources are up to date, the CM module may change the credentials for these resources. The CM module 22 can communicate with the resources (e.g. a software application) to change the credentials required to access the resources. Once the credentials have been changed, the new credentials are communicated to the CM module 22. The CM module 22 then updates the relevant records in the data store 24.

The system illustrated in FIG. 1 provides secure credential management for unattended applications. However, as will be appreciated by those of skill in the art, the SPM modules 14, 32 must be integrated with the requestor application and the target node 28, requiring skilled programmers and changes to the code of the requestor application 16. To encourage adoption of secure password authority systems within large enterprises running legacy applications, it is, therefore, desirable to provide a means to interface with the password authority system without requiring specialized recoding or programming knowledge.

Generally, the present invention provides a method and system through which it is possible to authenticate database connections for unattended requestor applications by installing and configuring a SPM target resource connectivity component (hereafter "SPM connectivity component"), without need to recode the requestor application. The SPM database connectivity component intercepts requests for a target resource, repackages the requests in a form comprehensible to a credential manager, accesses secure credentials from the credential manager, and passes the credentials to the target resource. The credential manager can, for example, be a CM node as described above, such as the CloakWare® Server Password Manager or other available credential managers.

Figure 2:
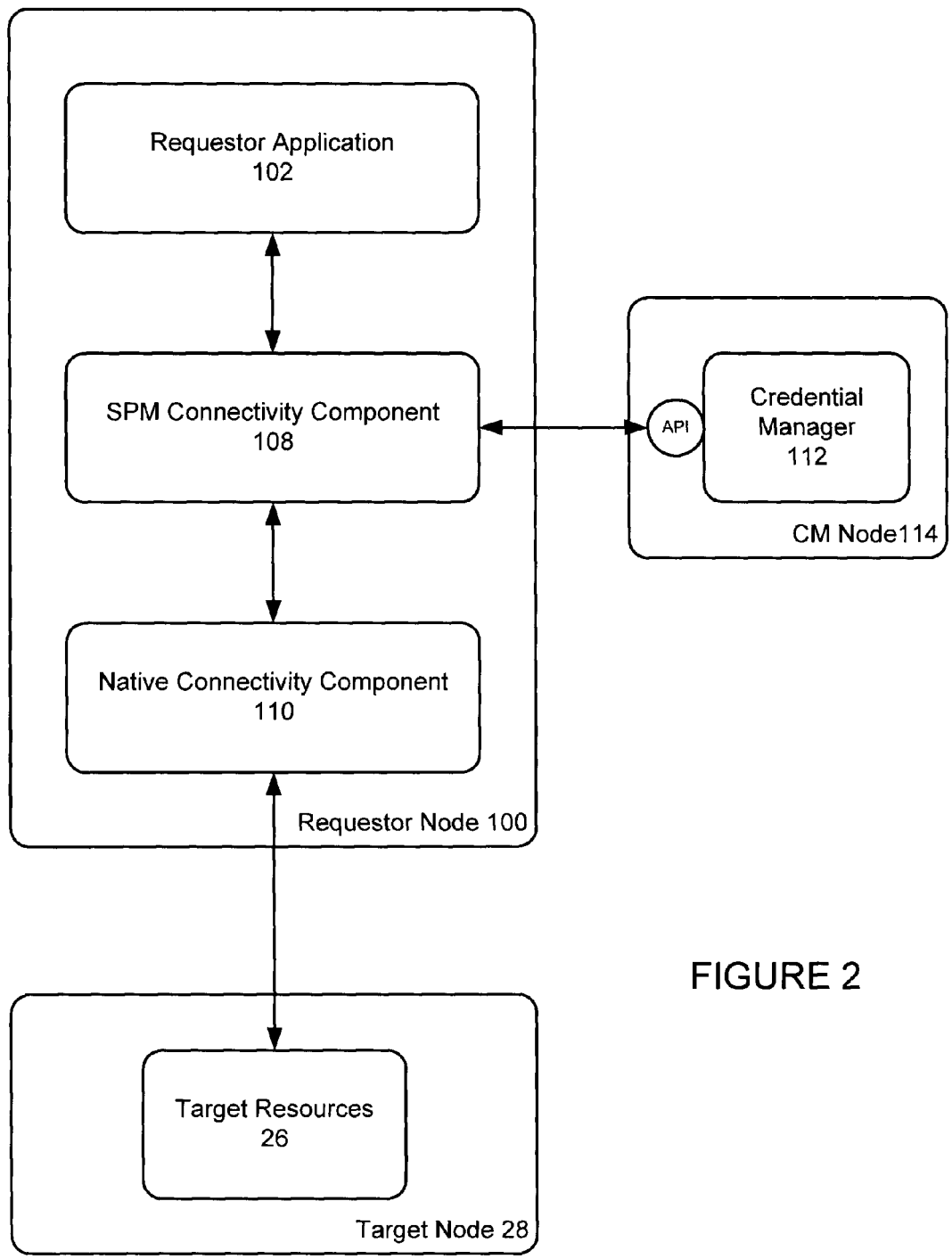
FIG. 2 is a block diagram of a system using a database connectivity component according to an embodiment of the invention.

FIG. 2 depicts the overall system architecture of an embodiment of the invention. A requestor node 100 has resident on it a requestor application 102 that requires access to a target resource(s) 104 resident at a target node 106. An SPM connectivity component 108, interposed between the requestor application 102 and native target resource connectivity component 110 (hereafter "native connectivity component"), intercepts requests from the requestor application 102 for access to the target resource 104, and routes them to a credential manager (CM) 112, resident at the requestor node 102, or resident at a CM node 114, as illustrated. Native connectivity components are known components that provide database connections for a requestor application by implementing standard database connection Application Programming Interfaces (APIs), such as, for example, JDBC or ODBC. The connections may be database specific.

The credential manager 112 is a component deployed to or available to a requestor node 100. The credential manager 112 coordinates credential requests for local requestor applications. The credential manager 112 typically provides API's for varying types of requestor applications. In an embodiment, the CM node 114 includes the components and functionality described above in relation to FIG. 1. The requestor node 100, the CM node 114, and the target node 106 are all nodes in a computer network and may be single machine servers or a collection of interconnected servers. The various modules in FIG. 2 are software modules which interact with the hardware of the nodes to execute their instructions.

Figure 3:
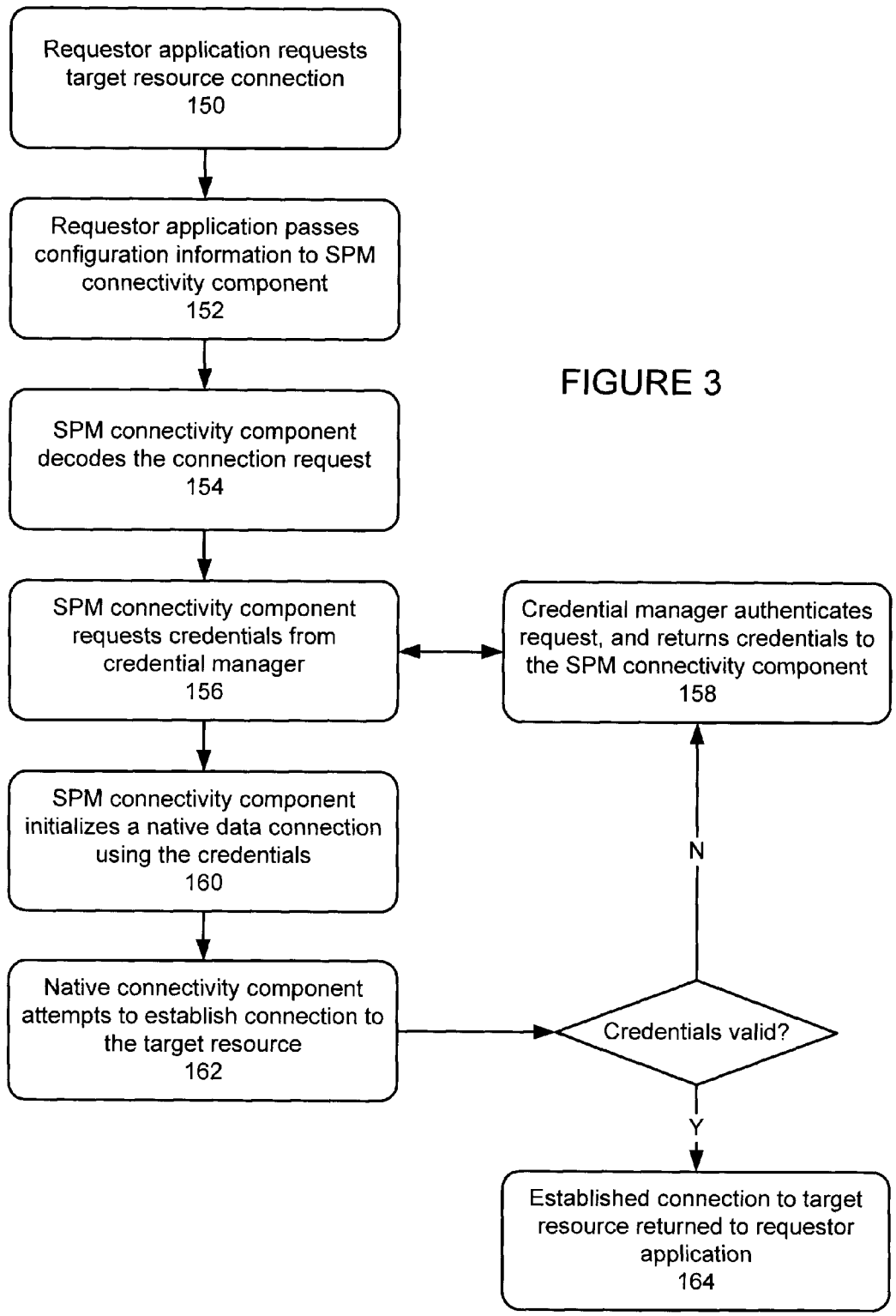
FIG. 3 is a flowchart of a database connection using a database connectivity component and a credential manager according to an embodiment of the invention.

The overall operation of a credential management system using the SPM connectivity component 108 is illustrated in FIG. 3, with reference to FIG. 2. The requestor application 102 requests connection to a target resource 104, such as a database (step 150). The SPM connectivity component 108 intercepts or receives this request (step 152), and decodes the connection request (step 154). The SPM connectivity component then requests credentials from the credential manager 112 (step 156). The credential manager 112 authenticates the request, and returns the necessary credentials to fulfill the request to the SPM connectivity component 108 (step 158). The SPM connectivity component 108 initializes a native database connection through the native connectivity component 110 using the credentials supplied by the credential manager 112 (step 160). The native connectivity component 110 then establishes, or attempts to establish, a connection to the external target system hosting the target resources 104 (step 162). If the credentials are valid, and the connection is established, an established connection to the target 104 is returned to the requestor application 102 (step 164). If the attempt to establish the connection is not successful, an optional retry can be executed. Further credentials are retrieved from the credential manager 112, and a connection retry is attempted commencing at step 156. The number of acceptable retries is a matter of design choice.

Figure 4:
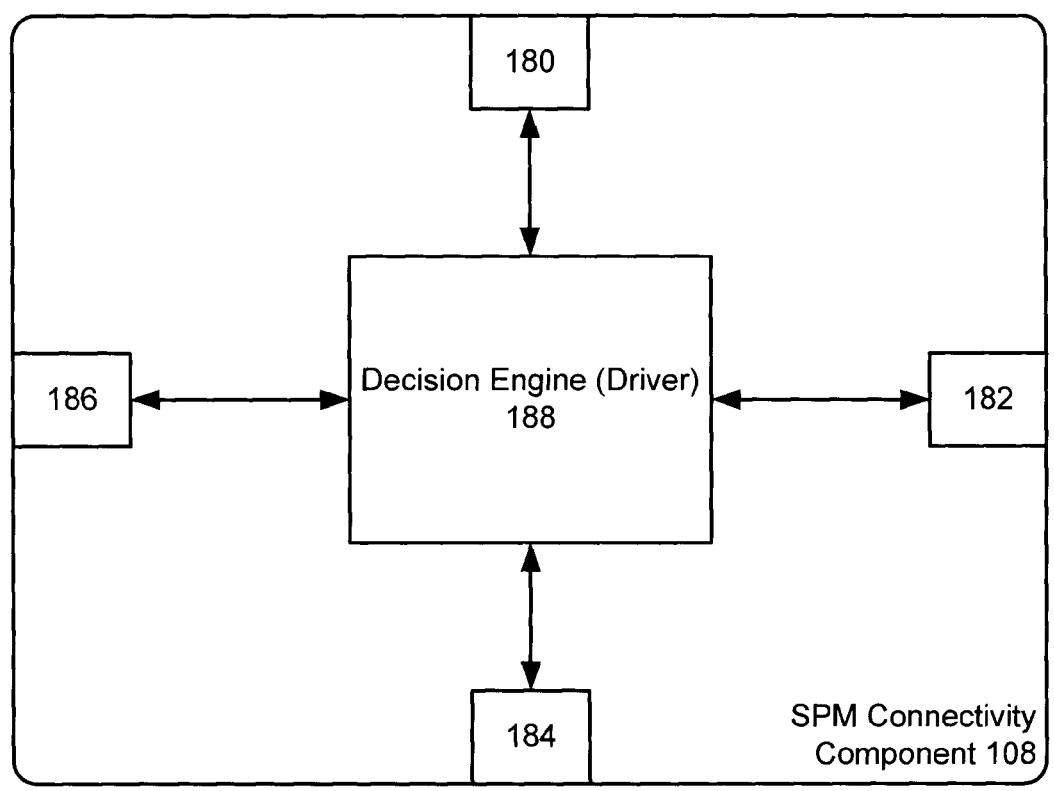
FIG. 4 is a block diagram of a database connectivity component according to an embodiment of the present invention.

As shown in FIG. 4, the SPM connectivity component 108 is a software module. It is deployed in conjunction with the native database connectivity component 110 and the credential manager 112. The SPM connectivity component 108 comprises a requestor interface 180 for communicating with the requestor application 102, a credential service interface 182 for communicating with the credential manager 112, a native target resource connectivity interface 184 for communicating with native connectivity components, a security interface 186 for allowing for updates from a security manager, and a decision engine 188 for determining how to convert a request from a requestor to an appropriate API call to the credential manager 112.

The SPM connectivity component provides an authenticated and authorized database connection for a requestor application. The SPM connectivity component serves as the database connectivity component which retrieves database, or other target resource, credentials on a real time basis, without requiring code changes to the requestor application where native connectivity components are dynamically loaded. The SPM connectivity component authenticates and authorizes all access for database connections for requestor applications.

The functioning of the SPM connectivity component 108 can best be understood with reference to example implementations. Two example embodiments are described below: a JDBC SPM connectivity component, and an ODBC SPM connectivity component. These examples are non-limiting, and illustrative only. The examples assume a familiarity with Java programming, and with JDBC and ODBC connections, as is expected from someone of skill in the art.

JDBC is an API for the Java programming language that defines how a client may access a database. It provides methods for querying and updating data in a database. The JDBC uses a custom Java DataSource object. A DataSource object is the representation of a data source in the Java programming language. In basic terms, a data source is a facility for storing data. It can be as sophisticated as a complex database for a large corporation or as simple as a file with rows and columns. A data source can reside on a remote server, or it can be on a local desktop machine. Applications access a data source using a connection, and a DataSource object can be thought of as a factory for connections to the particular data source that the DataSource instance represents. The custom Java DataSource object encapsulates the call to a data source or target resource, and transparently accesses the credential manager 112 to retrieve the secure credentials needed to access the data source.

The role of the SPM connectivity component 108 is the transparent management of authentication in the database connection acquisition. To achieve this functionality and feature capability, a proxy JDBC Driver class, referred to herein as an SPM Proxy Driver, is provided and implements the decision engine 188. This proxy Driver class operates on a specially defined URL that encodes all information required for the true underlying JDBC connection management and Driver utilization, managed by the native connectivity component 110. This proxy class is specified, by a user during configuration, as the Driver class for any database. The user can then encode the necessary JDBC URL information in a standard way. In execution, the JDBC Proxy Driver behaves as a normal JDBC driver, but is transparently performing delegated JDBC driver invocations, and calls to the credential manager 112. The proxy JDBC Driver class uses a specialized JDBC URL encoding which will be referred to as an SPM JDBC URL, details of which are provided below. Functionally, the SPM Proxy Driver obeys all requirements and follow all conventions of use that apply to a Java JDBC Driver class.

To securely retrieve the necessary credentials to access a target resource, a custom designated URL property is used to declare an SPM Alias. As described above, each target resource (e.g. an application on a target server) can be associated with a specific alias. Also associated with the alias are the target resource's credentials (e.g. account and password). A potential requestor application, which requests access to the target resource, when registered/validated, is then mapped to the alias along with that requestor application's access rights and any run-time criteria required for the release of credentials for access to the target resource. This injects a level of indirection for retrieving credentials—it allows credentials to change without any impact on the requestor application. Requestor applications, therefore, need not be individually notified if credentials required to access a specific resource are changed.

The custom designated URL property is defined to declare the exact driver class that the SPM Proxy Driver should use as the true (target) JDBC Driver. In all connection attempts, the credentials, such as user/password, are obtained from the credential manager 112. The SPM Proxy Driver ignores all caller-supplied user/password instances. The SPM Proxy Driver can preferably also handle cases of failure or error in the invocation of the credential manager 112. To treat these cases, certain SPM specific exceptions, necessarily derived from SQLException, can be defined.

The core class for the SPM JDBC proxying is the SPM Proxy Driver class, which implements the java.sql.Driver interface and contains all of the required service implementations. The SPM Proxy Driver class manages all SPM JDBC URL's. More specifically: a single instance of the SPM Proxy Driver class registered with a driver manager manages all SPM JDBC URL's. This means that different databases may be accessed concurrently through a single SPM Proxy Driver instance.

The SPM JDBC URL is a custom JDBC URL that encodes a true JDBC URL along with addition information for proxying the Driver and for handling and managing the credentials through the credential manager 112. The SPM JDBC URL format is defined as:

spm: [url]; P1=V1; ... ; Pn=Vn where
spm: is the literal prefix "spm:";
[url] is a true JDBC (base) URL which is user specific such as jdbc:hsqldb:hsql://localhost:9001/cspm1 each Pi is a property name for a property of the true JDBC URL or else one of the SPM distinguished properties SPMAlias or SPMDriver;
SPMAlias must appear in the Pi list. Its value must be the intended SPM Alias for use in the user/password lookup; and
SPMDriver may appear in the Pi list and if so must be a valid JDBC Driver for the [url] value.

The SPM properties are rendered into a Java Properties map from which the true JDBC Driver can acquire the values.

The decision engine 188 is implemented within the SPM Proxy Driver class, and decodes or parses the SPM JDBC URL into relevant parts that it will use internally. These parts are:

1. The Original URL: Defined as the SPM JDBC URL as specified.
2. The Base URL: defined as only the [url] fragment above.
3. The Driver URL: defined as the SPM JDBC URL with any occurrences of SPMAlias and SPMDriver removed (also occurrences of user and password removed).
4. The SPM Alias: defined as the value of the required SPMAlias property.
5. The Driver Class Name: defined as the value of the SPMDriver property if present and null otherwise.

It is the SPM JDBC URL that will be received by the SPM Proxy Driver class in all of its services where a URL parameter applies. The SPM Proxy Driver class obtains and holds the target JDBC Driver to call for the SPM JDBC URL connect by using an instance of the class named by the value of the property SPMDriver, if present, or otherwise by lookup for a driver which accepts the [url] (the Base URL). In either case, the acquisition of the target Driver can occurs by lookup through the DriverManager class. And, implementing the java.sql.Driver interface, the SPM Proxy Driver stores all of the data required for establishing connections for a given SPM JDBC URL, such as the configuration or fingerprint information of the requestor application or server, in an instance of the JdbcDriverUrlEntry class. The JdbcDriverUrlEntry instances can be stored in a cache keyed by the SPM JDBC URL.

The JDBC implementation of the SPM connectivity component provides a Java library (e.g. jar file with JavaDoc) that can be used by users to integrate the functionality of the credential manager 112 into their applications without recoding the application. In usage, the end user only needs to add the library with the driver and associated classes to the classpath of the requestor application Server; and configure DataSources in the requestor application server to use the SPM Proxy JDBC drivers specifying an SPM JDBC URL. More specifically, to use the SPM JDBC Driver, attributes in the configuration file are modified to set the connection-url as specified previously, and to set the driver-class to the SPM JDBC Driver The SPM Proxy Driver class and its affiliated classes form an isolated component that can be separately deployed. It has integration dependencies on the cspmclient.jar library, possibly log4j (or other logging system) when integrated, and the vendor-specific JDBC Driver classes as declared in configuration through the SPM JDBC URL.

The connection request is made by the requestor application 102 supplying a URL and set of properties. The request is received by the SPM Proxy Driver, which first checks if the received URL is a SPM JDBC URL and thus handled by the class. If the URL is not a SPM JDBC URL, the connection request fails. If the URL is a SPM JDBC URL, then the required JdbcDriverUrlEntry instance is obtained from the JdbcDriverUrlEntryCache. The associateDriver service of the JdbcUrlDriverEntryCache class is responsible for locating the target JDBC Driver that is associated with (bound to) a SPM JDBC URL in a JdbcUrlDriverEntry instance. The cache entry is created at this point if it does not exist.

A call is made to the credential manager 112 to retrieve the necessary secure credentials, such as a username and password, in each iterated attempt. Communication between the credential manager 112 and the SPM connectivity component embodied by the SPM Proxy Driver is preferably encrypted to avoid detection or interception by unauthorized parties. The encryption is previously negotiated between the credential manager 112 and the SPM Proxy Driver, and may, for example, involve an exchange of encryption keys. The credential manager 112 returns the secure credentials necessary to establish a connection with the target resource 26. On each attempt, a call is then made to the native target JDBC driver to obtain a connection. The parameters used are the base JDBC URL and a properties object containing the merged properties from the JdbcDriverUrlEntry instance and the properties provided by the requestor application 102. In the merged properties, the credentials, such as a hard-coded username and password, are overwritten by the values returned from the credential manager 112. A connection is returned immediately to the requestor application 102 if one is obtained. Otherwise, a retry can be initiated as described above in relation to FIG. 3, or an SQLException can be thrown to the caller.

This low-level driver management for connection acquisition means that all new connections obtained for a user whose database password has been changed (e.g. by the credential manager 112) are made using the new password. This action occurs automatically without any knowledge or intervention by any owning data source. Such connection management by the SPM JDBC driver ensures that database password changes are completely transparent to the data source's activities.

In an ODBC implementation, an custom SPM ODBC driver is provided. ODBC provides a standard software API method for accessing target resources, such as database management systems. The driver uses a credential manager COM object to retrieve the credentials from the credential manager 112 when a request to connect to the database is made from the requestor application 102. The request is then passed to the native target ODBC driver to complete the transition. Preferably, the SPM ODBC driver implements all ODBC 2.0 functions and some of the deprecated ODBC 1.0 functions for backward compatibility.

As with the SPM JDBC Driver, the SPM ODBC Driver implements the decision engine 188. The SPM ODBC Driver connection string contains the following information: Driver—the name of SPM ODBC Driver; Alias—the target Alias to send to the credential manager 112 when retrieving the credentials; and TargetDriver—the connection string for the target driver. The TargetDriver string contains all of the information required by the target driver, but does not contain the userId and/or password.

The SPM ODBC Driver needs to add functionality to three functions: SQLConnect—creates a connection to a database using a predefined DSN; SQLDriverConnect—creates a connection to a database using a connection string; and ConfigDSN—creates, modifies or deletes a DSN.

The SQLConnect function has 7 parameters. The first parameter is passed when calling the API function SQLConnect. The second and third parameters are used to retrieve the configuration. The remaining 4 parameters, username and password, are ignored. When the driver's SQLConnect function is called, it will: retrieve the Target Alias and Target DSN; retrieve the credentials using the Target Alias; and call the API function SQLConnect function passing the Target DSN and the credentials retrieved from the credential manager.

The SQLDriverConnect function has 8 parameters. The third and forth parameters are used to retrieve the configuration information. The remaining parameters are passed down when the API function SQLDriverConnect is called. When the driver's SQLDriverConnect function is called, it will: extract the Target Alias and Target Driver from the connection string; retrieve the credentials using the Target Alias; create a copy of the Target Driver connection string and add the credentials (user id and password) retrieved from the credential manager 112; and call the API function SQLDriverConnect function passing the update copy of Target Driver connection string.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

A person understanding this invention may now conceive of alternative structures and embodiments or variations of the above all of which are intended to fall within the scope of the invention as defined in the claims that follow.

What is claimed is:

1. A computer-implemented method for providing secure credentials for accessing a target resource, which when executed on one or more processors, causes the one or more processors to perform steps of:

receiving a connection request to the target resource from an unattended requestor application, the connection request including target resource information identifying the target resource and configuration information necessary to authenticate the requestor application, wherein the configuration information of the requestor application is fingerprint information, which uniquely identifies a node of the requestor application;

decoding the request to extract the target resource information and the configuration information required by a credential manager to authenticate the requestor application and to retrieve the secure credentials for accessing the target resource, the credential manager managing and storing credentials for the target resource;

securely communicating the extracted information to the credential manager to retrieve credentials;

generating a native target resource connection request to the target resource, including the retrieved credentials; and passing the native target resource connection request to a native target resource connectivity component to establish a connection between the requestor application and the target resource.

2. The method of claim 1, wherein decoding the request comprises parsing the request.

3. The method of claim 1, wherein securely communicating the extracted information to the credential manager comprises encrypting communications with the credential manager.

4. The method of claim 1, wherein the credentials include username and password.

5. The method of claim 1, wherein the method implements Java Database Connectivity (JDBC) Application Programming Interfaces (APIs).

6. The method of claim 5, wherein receiving the connection request comprises receiving a custom Uniform Resource Locator (URL) that encodes a JDBC URL containing a target resource URL, and a target alias for retrieving the credentials from the credential manager.

7. The method of claim 6, wherein generating the native target resource connection request comprises packaging the retrieved credentials with the target resource URL to provide a native JDBC URL.

8. The method of claim 1, wherein the method implements Open Database Connectivity (ODBC) APIs.

9. The method of claim 8, wherein receiving the connection request comprises receiving an ODBC connection request containing a target alias for retrieving the credentials from the credential manager, and a connection string for the native target resource connectivity component.

10. The method of claim 9, wherein generating the native target resource connection request comprises packaging the retrieved credentials with the connection string.

11. A computer program product comprising a computer-readable medium storing computer executable instructions which, when executed by one or more processors, cause said one or more processors to provide a method of providing secure credentials for accessing a target resource comprising:
receiving a connection request to the target resource from an unattended requestor application, the connection request including target resource information identifying the target resource and configuration information necessary to authenticate the requestor application, wherein the configuration information of the requestor application is fingerprint information, which uniquely identifies a node of the requestor application;
decoding the request to extract the target resource information and the configuration information required by a credential manager to authenticate the requestor application and to retrieve the secure credentials for accessing the target resource, the credential manager managing and storing credentials for the target resource;
securely communicating the extracted information to the credential manager;
based on the extracted information, authenticating, by the credential manager, the requestor application and in response to the success of the authentication retrieving, by the credential manager, corresponding one or more credential for accessing the target resource;
generating a native database connection request to the target resource, including the retrieved credential; and
passing the native database connection request to the native database connectivity component to establish the connection.

12. The computer program product of claim 11, wherein decoding the request comprises parsing the request.

13. The computer program product of claim 11, wherein securely communicating the extracted information to the credential manager comprises encrypting communications with the credential manager.

14. The computer program product of claim 11, wherein the credentials include username and password.

15. The computer program product of claim 11, wherein the function modules comprise Java Database Connectivity (JDBC) Application Programming Interfaces (APIs).

16. The computer program product of claim 15, wherein the connection request comprises a custom Uniform Resource Locator (URL) that encodes a JDBC URL containing a target resource URL, and a target alias for retrieving the credentials from the credential manager.

17. The computer program product of claim 16, wherein generating the native database connection request comprises packaging the retrieved credentials with the target resource URL to provide a native JDBC URL.

18. The computer program product of claim 11, wherein the functional modules comprise Open Database Connectivity (ODBC) APIs.

19. The computer program product of claim 18, wherein the connection request comprises an ODBC connection request containing a target alias for retrieving the credentials from the credential manager, and a connection string for the native target resource connectivity component.

20. The computer program product of claim 19, wherein generating the native database connection request comprises packaging the retrieved credentials with the connection string.

* * * * *